March 12, 1957    M. A. TIPPEL    2,784,664
PIE CRUST PROTECTOR
Filed June 23, 1954

INVENTOR.
MARY AGNES TIPPEL
BY
ATTORNEY

United States Patent Office 2,784,664
Patented Mar. 12, 1957

2,784,664

PIE CRUST PROTECTOR

Mary Agnes Tippel, Rock Island, Ill.

Application June 23, 1954, Serial No. 438,840

1 Claim. (Cl. 99—433)

The present invention relates to an improvement in means for protecting the edge of a pie crust from being burned while the central part of the crust is being baked. There are various devices for accomplishing the results sought in the present instance. However, there are believed to be none which will fit pies of various sizes. The devices heretofore made are such as will fit only one size of pie, but my construction will fit pies from eight inches to twelve inches in diameter because of the division into sections which permits spreading of the protector by bending the metal between the sections, thus allowing the protector to spread out and thereby offer protection to pies of different sizes.

In the drawings annexed hereto and forming a part hereof,

Figure 1:
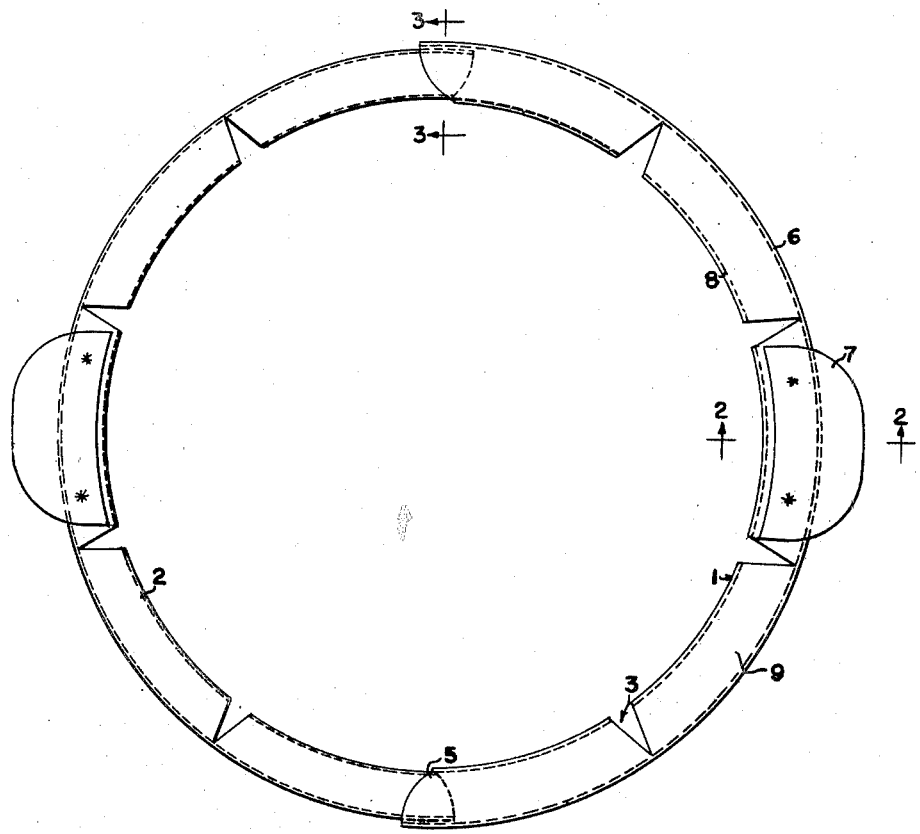
Fig. 1 shows a plan view of my protector.
Figure 2:
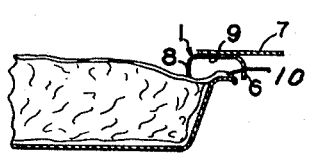
Fig. 2 shows a cross-section along the plane indicated by the line 2—2, in Fig. 1.
Figure 3:
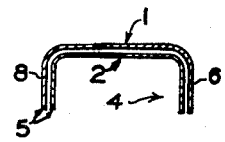
Fig. 3 shows a cross-section along the plane indicated by the line 3—3, in Fig. 1.

Reference will now be made in greater detail to the annexed drawings for a more complete description of this invention. By making the protector in two parts, adjustable laterally, with relation to each other, it is possible to spread them apart and make them fit pies of various diameters. The sections 1 and 2 are notched at various points, bendable at the notches 3, and channel-shaped, as shown at 4, making them overlap, as shown at 5. The band 9 is not cut through in forming the handle 7 where notches are formed in the flanges 6 and 8 so that the band 9 may be bent readily. Preferably the pie protector has two handles 7 formed by cutting out pieces of metal and fastening them to the flange 8, as shown in Figs. 1 and 2.

It is of course understood that the specific description of structure set forth above may be departed from without departing from the spirit of this invention as disclosed in this specification and as defined by the appended claim.

Having now described my invention, I claim:

A pie crust protector of the character described, comprising: a pair of completely separable semi-circular elements of inverted U-shaped cross section to provide an upper web and inner and outer depending flanges on each element, adapted to be complementarily assembled to afford a ring to encircle and overlie the marginal edge of a pie crust, the cross-sectional size of one element being slightly larger than that of the other element so that the free ends of said one element receive the free ends of said other element in a sliding interfit, the inner flange and upper web of each element being notched so that the respective outer flange is the sole continuous semi-circular portion of said element, whereby the elements, when complementarily arranged to afford a ring as aforesaid, are flexible and capable of deformation to vary the diameter of the ring, said slidably interfitting free ends of the elements accommodating such variations in diameter while the elements are assembled.

References Cited in the file of this patent

UNITED STATES PATENTS

| | | |
|---|---|---|
| 1,180,782 | McLaughlin | Apr. 25, 1916 |
| 1,240,030 | Darley | Sept. 11, 1917 |
| 1,827,062 | Austin | Oct. 13, 1931 |
| 2,159,355 | Goetze | May 23, 1939 |
| 2,257,408 | Alexander | Sept. 30, 1941 |